United States Patent
Axmon et al.

(10) Patent No.: US 11,864,166 B2
(45) Date of Patent: *Jan. 2, 2024

(54) UPLINK TRANSMISSION TIMING CONTROL

(71) Applicant: Telefonaktiebolaget LM Ericsson (publ), Stockholm (SE)

(72) Inventors: Joakim Axmon, Kävlinge (SE); Dandan Hao, Beijing (CN); Muhammad Kazmi, Bromma (SE); Santhan Thangarasa, Vällingby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 522 days.

This patent is subject to a terminal disclaimer.

(21) Appl. No.: 16/715,739

(22) Filed: Dec. 16, 2019

(65) Prior Publication Data

US 2020/0120671 A1    Apr. 16, 2020

Related U.S. Application Data

(63) Continuation of application No. 15/253,318, filed on Aug. 31, 2016, now Pat. No. 10,555,297, which is a
(Continued)

(51) Int. Cl.
*H04W 72/04* (2023.01)
*H04W 4/70* (2018.01)
(Continued)

(52) U.S. Cl.
CPC ......... *H04W 72/0446* (2013.01); *H04W 4/70* (2018.02); *H04W 56/0045* (2013.01); *H04W 72/21* (2023.01); *H04W 72/23* (2023.01)

(58) Field of Classification Search
CPC . H04W 4/70; H04W 72/0446; H04W 72/042; H04W 72/0413; H04W 72/12;
(Continued)

(56) References Cited

U.S. PATENT DOCUMENTS

2010/0278142 A1   11/2010   Dwyer et al.
2011/0158188 A1    6/2011   Womack et al.
(Continued)

FOREIGN PATENT DOCUMENTS

CN       1913418 A    2/2007
CN     102893647 A    1/2013
(Continued)

OTHER PUBLICATIONS

Unknown, Author, "Scheduling of DL and UL Data Channels for NB-IoT", 3GPP TSG RAN WG1 Meeting #84, R1-160469, St Julian's, Malta, Feb. 15-19, 2016, 1-5.
(Continued)

*Primary Examiner* — Joseph E Avellino
*Assistant Examiner* — Mon S Davenport
(74) *Attorney, Agent, or Firm* — Murphy, Bilak & Homiller, PLLC

(57) ABSTRACT

One or more embodiments herein relate to a method for an uplink transmission timing adjustment in a wireless communication device served by a network node and configured to operate in a coverage enhancement mode. The coverage enhancement mode comprises a repetitive transmission of a first uplink signal during a first repetition period. The method comprises determining a change in a downlink timing (210), determining whether the first repetition period is ongoing (240); and in response to the change in the downlink timing and the first repetition period being ongoing, performing an adjustment of an uplink transmission timing outside the first repetition period (260).

32 Claims, 6 Drawing Sheets

Related U.S. Application Data continuation-in-part of application No. PCT/CN2016/078095, filed on Mar. 31, 2016.

(51) Int. Cl.
*H04W 72/0446* (2023.01)
*H04W 56/00* (2009.01)
*H04W 72/21* (2023.01)
*H04W 72/23* (2023.01)

(58) Field of Classification Search
CPC ..... H04W 74/08; H04W 88/02; H04W 48/12; H04W 92/18; H04W 48/16; H04W 52/146; H04W 52/36; H04W 52/50; H04W 56/0045; H04W 72/048; H04W 72/0493; H04W 88/04; H04L 1/0072; H04L 1/08; H04L 1/1845; H04L 27/2602; H04L 27/2607; Y02D 70/00; H04B 1/71; H04B 2201/696; H04B 2201/698; H04J 11/0086

See application file for complete search history.

(56) References Cited

U.S. PATENT DOCUMENTS

| | | | |
|---|---|---|---|
| 2013/0188473 A1 | 7/2013 | Dinan | |
| 2014/0086219 A1 | 3/2014 | Suzuki et al. | |
| 2015/0131579 A1* | 5/2015 | Li | H04L 1/0072 370/329 |
| 2016/0262182 A1 | 9/2016 | Yang et al. | |
| 2016/0353440 A1* | 12/2016 | Lee | H04W 72/0453 |
| 2017/0290001 A1 | 10/2017 | Axmon et al. | |
| 2017/0347335 A1 | 11/2017 | Yi et al. | |
| 2018/0076924 A1 | 3/2018 | Lee et al. | |

FOREIGN PATENT DOCUMENTS

| | | |
|---|---|---|
| CN | 104581925 A | 4/2015 |
| CN | 104601276 A | 5/2015 |
| CN | 105409136 A | 3/2016 |
| CN | 104581925 B | 1/2019 |
| EP | 2676487 A1 | 12/2013 |
| EP | 3065496 A1 | 9/2016 |
| JP | 2016020304 A | 2/2016 |
| JP | 2017139672 A | 8/2017 |
| RU | 2516449 C2 | 5/2014 |
| WO | 2012112103 A1 | 8/2012 |
| WO | 2015062470 A1 | 5/2015 |
| WO | 2015109607 A1 | 7/2015 |
| WO | 2015116732 A1 | 8/2015 |
| WO | 2015130618 A2 | 9/2015 |
| WO | 2015171166 A1 | 11/2015 |
| WO | 2016003336 A1 | 1/2016 |
| WO | 2016013698 A1 | 1/2016 |
| WO | 2016025638 A1 | 2/2016 |
| WO | 2016025899 A1 | 2/2016 |

OTHER PUBLICATIONS

3GPP, "3rd Generation Partnership Project; Technical Specification Group Radio Access Network; Evolved Universal Terrestrial Radio Access (E-UTRA); Requirements for support of radio resource management (Release 12)", 3GPP TS 36.133 V12.7.0, Mar. 2015, pp. 1-1014.

3GPP, "3rd Genration Partnership Project; Technical Specification Group Radio Access Network; E-UTRA; Requirements for support of radio resource management (Release 13)", 3GPP TS 36.133 V13.2.0, Jan. 2016, pp. 1-50.

3GPP, "PRACH for MTC UE", 3GPP TSG RAN WG1 Meeting #82bis, R1-155867, Malmö, Sweden, Oct. 5-9, 2015, pp. 1-6.

Unknown, Author, "Analysis of Uplink Transmit Timing in NB-IoT", Ericsson, 3GPP TSG RAN WG4 Meeting #78bis, R4-161945, San Jose del Caba, Mexico, Apr. 11-15, 2016, pp. 1-7.

Unknown, Author, "Discussions on timing requirements for eMTC", 3GPP TSG RAN WG4 Meeting #78bis, R4-162569, San Jose del Cabo, Mexico, Apr. 11-15, 2016, pp. 1-5.

Unknown, Author, "Introduction of further LTE Physical Layer Enhancements for MTC—Change Request", 3GPP TSG-RAN Meeting #70, R1-157926, Stiges, Spain, Dec. 7-10, 2015, pp. 1-2.

Unknown, Author, "Introduction of Rel-13 eMTC feature to LTE RAN1specs", 3GPP TSG RAN Meeting #70, RP-152024, Sitges, Spain, Dec. 7-10, 2015, p. 1.

Unknown, Author, "Timing advance for NB-IoT", Ericsson, 3GPP TSG RAN WGI NB-IoT Ad-Hoc Meeting, R1-162052, Sophia Antipolis, France, Mar. 22-24, 2016, pp. 1-4.

Unknown, Author, "Timing requirements for eMTC", 3GPP TSG-RAN4 Meeting #78bis, R4-162561, San Jose del Cabo, Mexico, Apr. 11-15, pp. 1-5.

Unknown, Author, "Uplink transmit timing adjustments in HD-FDD operation", 3GPP TSG-RAN WG4 Meeting #78AH, Kista, Sweden, May 3-4, 2016, pp. 1-6.

Unknown, Author, "Uplink transmit timing adjustments in HD-FDD operation—Change Request", 3GPP TSG-RAN WG4 Meeting #78AH, R4-78AH-0192, Kista, Sweden, May 3-4, 2016, pp. 1-4.

Unknown, Author , "NB-IoT—Remaining issues for random access procedure", 3GPP TSG-RAN WG1 NB-IoT Ad-Hoc Meeting, R1-161836, Sophia Antipolis, France, Mar. 22-24, 2016, 1-7.

Unknown, Author , "Pairing of Users in Enhanced R99 Voice in SHO", 3GPP TSG-RAN WG1 Meeting #74 R1-133731, Barcelona, Spain, Aug. 19-23, 2013, 1-7.

Unknown, Author , "Signalling methods for TDD UL/DL reconfiguration with different time scales", 3GPP TSG RAN WG1 Meeting #72, R1-130701, St Julian's, Malta, Jan. 28-Feb. 1, 2013, 1-4.

Unknown, Author , "TP on DL DCH Enhancements", 3GPP TSG RAN WG1 Meeting #74 R1-133784, Barcelona, Spain, Aug. 19-23, 2013, 1-27.

\* cited by examiner

UPLINK TRANSMISSION TIMING CONTROL

TECHNICAL FIELD

Embodiments of the disclosure generally relate to the field of wireless communication, and more specifically, to uplink transmission timing control in a wireless communication device, such as an Evolved Machine-type communication (eMTC) device and/or a Narrowband Internet-of-things (NB-IoT) device.

BACKGROUND

Current specifications for the wireless system standardized by the members of the $3^{rd}$-Generation Partnership (3GPP) and referred to as "Long Term Evolution of UMTS (LTE)" (LTE) allow a wireless communication device to modify the uplink transmission timing in response to a detected change in serving cell downlink timing, provided that such modifications are carried out gradually according to rules specified in 3GPP TS 36.133 V12.7.0, Section 7.1.2. For example, for non-initial transmission and an LTE bandwidth of 1.4 MHz (minimum sample rate 1.92 MS/s):

- maximum timing adjustment in one correction shall not exceed 17.5 TS (0.6 μs),
- minimum aggregated adjustment rate shall be 7 TS (0.2 μs) per second, and
- maximum aggregated adjustment rate shall be 17.5 TS (0.6 μs) per 200 milliseconds (ms).

The network node may send timing advance commands (TACs) to the wireless communication device to adjust the uplink transmission timing in order to have the uplink signals arrive at the network node receiver at the desirable point in time.

When wireless communication devices operate in a coverage enhancement mode, wherein the coverage enhancement is provided by message repetition, the timing advance control loop latency becomes longer than in conventional LTE system operation. This is because the uplink reference signals from multiple subframes may have to be averaged or filtered by the network node, to determine channel estimates from which the misalignment with respect to the desirable signal reception time can be determined. Additionally, when a half-duplex frequency-division duplexing (HD-FDD) configuration is used by the wireless communication device (e.g., in HD-FDD eMTC and/or NB-IoT devices), the network node has fewer opportunities to send TACs to the device. Particularly, during an uplink transmission period, the wireless communication device operating in HD-FDD configuration will not listen to the downlink and therefore is out of reach for the network node until tuning back to a downlink reception period.

As it is unspecified how and when the wireless communication device will adjust its timing when operating in enhanced coverage and in particular when uplink signals are transmitted with a certain number of repetitions, the existing rules in 3GPP TS 36.133 V12.7.0, Section 7.1.2 cannot be applied for any device (e.g., eMTC, NB-IoT devices etc) that is operating in an enhanced coverage mode and employing repetitions of the uplink signal transmission.

SUMMARY

An object of some of the techniques and apparatuses described in detail below obviate at least one of the above disadvantages and provide improved communication between a wireless communication device, such as eMTC or NB-IoT, and a network node in a wireless communication system. According to a first aspect of the techniques described herein, one or more of the objects are achieved by a wireless communication system. The system comprises a wireless communication device configured to operate in a coverage enhancement mode comprising a repetitive transmission of a first uplink signal during a first repetition period, and a network node serving the wireless communication device. The network node comprises a transmitting unit for transmitting a reference signal to the wireless communication device. The wireless communication device comprises a first determining unit configured to determine a change in a downlink timing based on the reference signal, a second determining unit configured to determine whether the first repetition period is ongoing and an adjusting unit configured to, in response to the change in the downlink timing and the first repetition period being ongoing, perform an adjustment of an uplink transmission timing of the first uplink signal outside the first repetition period.

According to another aspect, one or more of the objects are achieved by a method for an uplink transmission timing adjustment in a wireless communication device served by a network node and configured to operate in a coverage enhancement mode. The coverage enhancement mode comprises a repetitive transmission of a first uplink signal during a first repetition period. The method comprises determining a change in a downlink timing, determining whether the first repetition period is ongoing and in response to the change in the downlink timing and the first repetition period being ongoing, performing an adjustment of an uplink transmission timing of the first uplink signal outside the first repetition period.

According to yet another aspect, one or more of the objects are achieved by a method for an uplink transmission timing adjustment in a wireless communication device served by a network node and configured to operate in a coverage enhancement mode. The coverage enhancement mode comprises repetitive transmissions of multiple uplink signals within respective repetition periods. The method comprises aligning the respective repetition periods by shifting in time at least one of start or end points of the respective repetition periods according to a predetermined rule, such that an overlap time of the respective repetition periods is maximized or single transmission of the multiple uplink signals is minimized.

According to yet another aspect, one or more of the objects are achieved by a wireless communication device served by a network node and configured to operate in a coverage enhancement mode. The coverage enhancement mode comprises a repetitive transmission of a first uplink signal during a first repetition period. The wireless communication device comprises a first determining unit configured to determine a change in a downlink timing, a second determining unit configured to determine whether the first repetition period is ongoing, and an adjusting unit configured to, in response to the change in the downlink timing and the first repetition period being ongoing, perform an adjustment of an uplink transmission timing of the first uplink signal outside the first repetition period.

According to yet another aspect, one or more of the objects are achieved by a method for enhancing an uplink transmission timing adjustment procedure for a wireless communication device. The method comprises determining that the wireless communication device is to be configured to transmit at least two uplink signals over at least partly overlapping repetition periods, and enabling the wireless communication device to align the respective repetition periods of the at least two uplink signals.

According to yet another aspect, one or more of the objects are achieved by a network node for enhancing an uplink transmission timing adjustment procedure for a wireless communication device. The network node comprises a determining unit configured to determine that the wireless communication device is to be configured to transmit at least two uplink signals over at least partly overlapping repetition periods, and an enabling unit configured to enable the wireless communication device to align the respective repetition periods of the at least two uplink signals.

According to yet another aspect, one or more of the objects are achieved by a wireless communication device served by a network node and configured to operate in a coverage enhancement mode. The wireless communication device comprises a non-transitory machine-readable storage medium having stored instructions therein, and a processor communicatively coupled to the non-transitory machine-readable storage medium. The processor is configured to execute the instructions stored in the non-transitory machine-readable storage medium to perform a method in the wireless communication device.

According to yet another aspect, one or more of the objects are achieved by a network node for enhancing an uplink transmission timing adjustment procedure for a wireless communication device. The network node comprises a non-transitory machine-readable storage medium having stored instructions therein, and a processor communicatively coupled to the non-transitory machine-readable storage medium. The processor is configured to execute the instructions stored in the non-transitory machine-readable storage medium to perform a method in the network node.

According to yet another aspect, one or more of the objects are achieved by a method in a UE served by a serving cell. The method comprises the steps of determining that downlink timing of a reference signal received at the UE from the serving cell has changed with respect to a reference time by a certain amount; determining whether the UE is configured to transmit a first uplink signal with a certain repetition over a time period, T0; and determining an adjustment time resource in which the uplink transmit timing for transmitting the first signal is adjusted, which adjustment time resource is determined in response to the determined change in the downlink reception timing and depends on whether the UE is configured with the first signal with or without repetitions (e.g., adjustment time resource such as a subframe occurs immediately after T0 if repetition is configured).

According to yet another aspect, one or more of the objects are achieved by a method in a UE served by a serving cell. The method comprises the steps of: determining that downlink timing of a reference signal received at the UE from the serving cell has changed with respect to a reference time by a certain amount; determining that the UE is configured to transmit at least two uplink signals over at least partly overlapping repetition periods, comprising a first uplink signal with a certain repetition over a time period, T1 and a second uplink signal with a certain repetition over a time period, T2; and determining an adjustment time resource in which the uplink transmit timing for transmitting at least one of the first signal and the second signal is adjusted, which adjustment time resource is determined in response to the determined change in the downlink reception timing and further depends on the relations between the starting times of T1 and T2 and/or terminating times of T1 and T2 (e.g., adjustment time resource such as a subframe occurs immediately after T2 if T2 terminates after T1).

According to yet another aspect, one or more of the objects are achieved by a method in a network node serving a UE. The method comprises the steps of: determining that downlink timing of a reference signal received at the UE from the serving cell has changed with respect to a reference time by a certain amount; determining that the UE is to be configured to transmit at least two uplink signals over at least partly overlapping repetition periods comprising a first uplink signal with a certain repetition over a time period, T1 and a second uplink signal with a certain repetition over a time period, T2; and configuring the UE with information for enabling the UE to transmit the first uplink signal and the second uplink signal such that T1 and T2 are related by a certain relation, e.g., one or more of: T1 and T2 start at the same time, e.g., in the same time resource such as in the same subframe, T1 and T2 end at the same time, e.g., in the same time resource such as in the same subframe, T1 and T2 start within a certain time duration ($\Delta 1$), e.g., within X number of time resources such as 5 subframes, and T1 and T2 end within a certain time duration ($\Delta 2$), e.g., within Y number of time resources such as 10 subframes.

According to yet another aspect, one or more of the objects are achieved by a computer-readable medium carrying instructions, which, when executed by a processor, causes the processor to carry out one or more of the above methods.

According to yet another aspect, one or more of the objects are achieved by a computer-program accessible by a processor of a wireless communication device or a network node, which when executed by the processor, causes the processor to carry out one or more of the above methods.

One or more of these aspects can facilitate accumulation and filtering of repeated uplink transmissions at the network node side, and thus improve the uplink throughput of the wireless communication system.

BRIEF DESCRIPTION OF THE DRAWINGS

Embodiments in the disclosure may best be understood by referring to the following description and the accompanying drawings that are used to illustrate embodiments of the disclosure. In the drawings.

DESCRIPTION OF EMBODIMENTS

Figure 1:
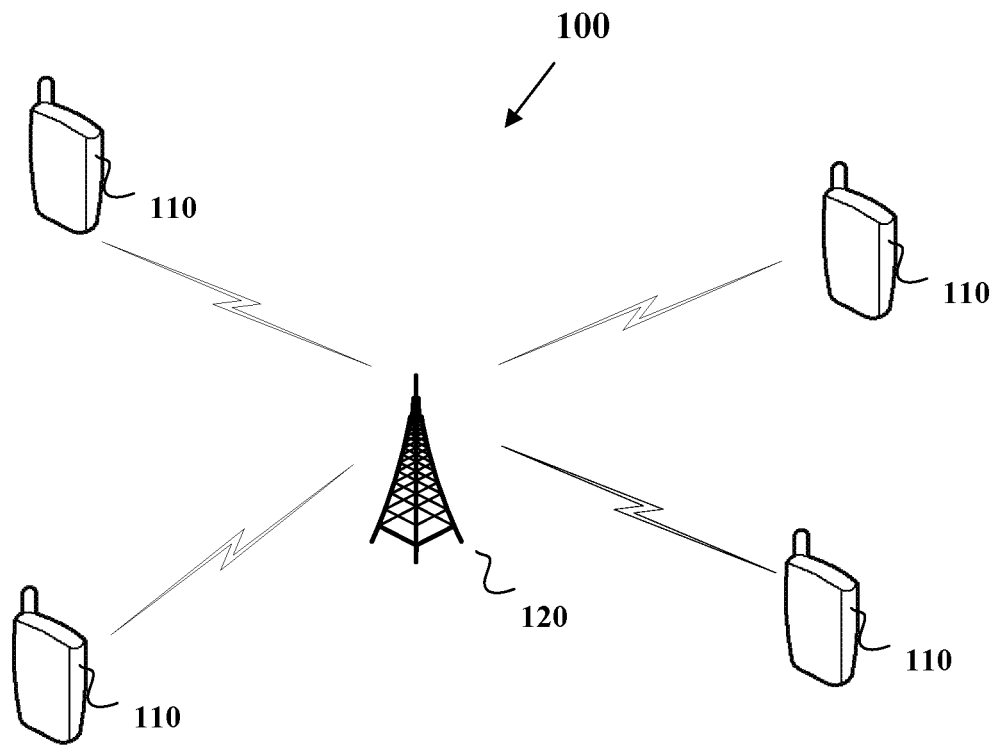
FIG. 1 is a simplified block diagram of a wireless communication system according to an exemplary embodiment.

The foregoing and other objects, features, and advantages of the embodiments described herein will be apparent from the following more particular description of preferred embodiments as illustrated in the accompanying drawings in which reference characters refer to the same parts throughout the various views. The drawings are not necessarily to scale, and the dimensions of certain features may have been exaggerated for the sake of clarity. Emphasis is instead being placed upon illustrating the principles of the embodiments herein.

Unless defined otherwise, technical and scientific terms used herein have the same meaning as is commonly understood by one of ordinary skill in the art to which this disclosure belongs. Unless it is otherwise clear from the context, the terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of "including", "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, the terms "circuit", "circuitry", "controller", and "processor" may include either a single component or a plurality of components, which are either active and/or passive and are connected or otherwise coupled together to provide the described function.

References in the specification to "one embodiment," "an embodiment," "an example embodiment,", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the disclosure. However, such notation should not be taken to mean that these are the only options or optional operations, and/or that blocks with solid borders are not optional in certain embodiments of the disclosure.

In the following description and claims, the terms "coupled" and "connected", along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

eMTC eMTC features specified in 3GPP technical contributions identified by 3GPP as contribution documents 3GPP RP-152024 and 3GPP R1-157926 include a low-complexity user equipment (UE) category called UE category M1 (or Cat-M1 for short) and coverage enhancement techniques, CE modes A and B, that can be used together with UE category M1 or any other LTE UE category.

All eMTC features, for both Cat-M1 and CE modes A and B, as defined in 3GPP TS 36.133 V12.7.0, Section 7.1.2, operate using a reduced maximum channel bandwidth compared to normal LTE. The maximum channel bandwidth in eMTC is 1.4 MHz, whereas it is up to 20 MHz in normal LTE. The eMTC UEs are still able to operate within the larger LTE system bandwidth, generally without problems. The main difference compared to normal LTE UEs is that the eMTCs can only be scheduled with 6 physical resource blocks (PRBs) at a time, where each of these PRBs has a bandwidth of 180 kHz.

In CE modes A and B, the coverage of physical channels is enhanced through various coverage enhancement techniques, the most important being repetition or retransmission. In its simplest form, this means that the 1-millisecond subframe to be transmitted is repeated a number of times, e.g., just a few times if a small coverage enhancement is needed or hundreds or thousands of times if a large coverage enhancement is needed.

NB-IoT

The objective of the Narrow Band Internet-of-things (NB-IoT) initiative of the 3GPP is to specify a radio access for cellular internet of things (IoT), based to a great extent on a non-backward-compatible variant of E-UTRA (LTE), that addresses improved indoor coverage, support for massive number of low throughput devices, low delay sensitivity, ultra-low device cost, low device power consumption and (optimized) network architecture.

The NB-IoT carrier BW (Bw2) is 200 KHz. Examples of the operating bandwidth (Bw1) of LTE, in contrast, are 1.4 MHz, 3 MHz, 5 MHz, 10 MHz, 15 MHz, 20 MHz, etc.

NB-IoT radio access supports three different modes of operation:

1. 'Stand-alone operation' utilizing, for example, the spectrum currently being used by GERAN systems as a replacement of one or more GSM carriers. In principle this mode of operation can use any carrier frequency which is neither within the carrier of another co-located (or overlapping) system nor within the guard band of another system's operating carrier. The other system can be another NB-IoT operation or any other radio access technology (RAT), e.g., LTE.
2. 'Guard band operation' utilizing the unused resource blocks within a LTE carrier's guard-band. The term guard band may also interchangeably be called guard bandwidth. As an example, in the case of an LTE BW of 20 MHz (i.e., Bw1=20 MHz or 100 RBs), the guard band operation of NB-IOT can be placed anywhere outside the central 18 MHz but within 20 MHz LTE BW.
3. 'In-band operation' utilizing resource blocks within a normal LTE carrier. The in-band operation may also interchangeably be called in-bandwidth operation. More generally the operation of one RAT within the BW of another RAT is also called in-band operation. As an example, in a LTE BW of 50 RBs (i.e., Bw1 of 10 MHz or 50 RBs), NB-IoT operation over one resource block (RB) within the 50 RBs is called in-band operation.

In NB-IoT, the downlink transmission is based on Orthogonal Frequency-Division Multiplexing (OFDM), with 15 kHz subcarrier spacing for all the scenarios: stand-alone, guard-band, and in-band. For uplink transmission, both multi-tone transmissions, based on single-carrier Frequency-Division Multiple Access (SC-FDMA), and single tone transmission are supported. This means that the physical waveforms for NB-IoT in downlink and also partly in uplink are similar to those in legacy LTE.

In the downlink design, NB-IoT supports both master information broadcast and system information broadcast which are carried by different physical channels. For in-band operation, it is possible for NB-IoT UE to decode NB-PBCH (also referred to as NPBCH) without knowing the legacy PRB index. NB-IoT supports both downlink physical control channel (NB-PDCCH, also referred to as NPDCCH) and downlink physical shared channel (PDSCH, also referred to as NPDSCH). The operation mode of the NB-IoT radio access must be indicated to the UE, and currently 3GPP consider indication by means of NB-SSS (also referred to as NSSS), NB-MIB (carried on NB-PBCH, also referred to as NPBCH), or perhaps other downlink signals.

The reference signals to be used in NB-IoT have not yet been specified. However, it is expected that the general design principle will follow that of legacy LTE. Downlink synchronization signals will most likely consist of primary synchronization signal (NB-PSS, also referred to as NPSS) and secondary synchronization signal (NB-SSS, also referred to as NSSS).

Half-Duplex Operation

In half-duplex (HD) operation, or more specifically half-duplex FDD (HD-FDD) operation, the uplink (UL) and downlink (DL) transmissions take place on different paired carrier frequencies but not simultaneously in time in the same cell. This means that the uplink and downlink transmissions take place in different time resources. Examples of a time resource are symbols, time slots, subframes, transmission time intervals (TTIs), interleaving times, etc. In other words, uplink and downlink (e.g., subframes) do not overlap in time. The number and location of subframes used for downlink, uplink, or unused subframes can vary on a frame-to-frame basis, or on a basis of multiple frames. For example, in one radio frame (say frame #1), subframes #9, #0, #4 and #5 may be used for downlink, while subframes #2 and #7 are used for uplink transmission. But in another frame (say frame #2), subframes #0 and #5 are used for downlink and subframes #2, #3, #5, #7 and #8 are used for uplink transmission.

Timing Advance

In order to preserve orthogonality in uplink SC-FDMA transmissions, the uplink transmissions from multiple user equipments (UEs) in LTE need to be time aligned at a receiver, such as a base station, e.g., an LTE eNode B or the like. This means that the transmit timing of those UEs that are under the control of the same eNode B should be adjusted to ensure that their received signals arrive at the eNode B receiver at approximately the same time. More specifically, their received signals should arrive well within the cyclic prefix (CP), where the normal CP length is about 4.7 is. This ensures that the eNode B receiver is able to use the same resources, i.e., the same Discrete Fourier Transform (DFT) or Fast Fourier Transform (FFT) resource, to receive and process the signals from multiple UEs.

The uplink timing advance (TA) is maintained by the eNode B through timing advance commands, also referred to as timing alignment commands, sent to the UE based on measurements on uplink transmissions from that UE. For example, the eNode B measures a two-way propagation delay or round-trip time for each UE, to determine the value of the TA required for that UE.

For a timing advance command received on subframe n, the corresponding adjustment of the uplink transmission timing is applied by the UE from the beginning of subframe n+6. The timing advance command indicates the change of the uplink timing relative to the current uplink timing of the UE transmission as multiples of 16 Ts, where Ts=32.5 ns and is called the "basic time unit" in LTE.

In the case of random access response messages transmitted by the eNode B's, an 11-bit timing advance command (TA) for a Timing Advance Group (TAG) indicates NTA values by index values of TA=0, 1, 2, . . . , 1282, where an amount of the time alignment for the TAG is given by NTA=TA×16. NTA is defined above in section "Alignment of E-UTRA TDD measurement gaps with particular subframe offsets".

In other cases, a 6-bit timing advance command (TA) for a TAG indicates adjustment of the current NTA value, NTA,old, to the new NTA value, NTA,new, by index values of TA=0, 1, 2, . . . , 63, where NTA,new=NTA,old+(TA−31)×16. Here, adjustment of NTA value by a positive or a negative amount indicates advancing or delaying the uplink transmission timing for the TAG by a given amount respectively.

Timing advance updates are signaled by the evolved Node B (eNB) to the UE in MAC PDUs.

Coverage Enhancements

The path loss between IoT device and the base station can be very large in some scenarios, such as when the device is used as a sensor or metering device located in a remote location such as in the basement of the building. In such scenarios, the reception of the signal from base station may be very challenging. For example, the path loss can be worse by 20 dB, compared to normal operation. In order to cope with such challenges, the coverage in uplink and/or in downlink has to be substantially enhanced with respect to the normal coverage (also referred to as legacy coverage). This is realized by employing one or several advanced techniques in the UE and/or in the radio network node for enhancing the coverage. Some non-limiting examples of such advanced techniques include transmit power boosting, repetition of transmitted signal, applying additional redundancy to the transmitted signal, use of advanced/enhanced receiver architectures, etc. In general, when employing such coverage enhancing techniques, the IoT radio access is regarded to be operating in 'coverage enhancing mode' or coverage extending mode.

When coverage enhancement is provided by means of transmission repetitions, the maximum number of repetitions for PDSCH and PUSCH, respectively, for coverage enhancement modes A and B are given by cell-specific broadcasted parameters:

pdsch-maxNumRepetitionCEmodeA (up to 32 repetitions),
pdsch-maxNumRepetitionCEmodeB (up to 2048 repetitions),
pusch-maxNumRepetitionCEmodeA (up to 32 repetitions),
pusch-maxNumRepetitionCEmodeB (up to 2048 repetitions).

The exact number of repetitions to use by a particular wireless communication device is signaled dynamically via the downlink control information (DCI), which is carried over the downlink control channel M-PDCCH. This channel, too, may be repeated according to a specific repetition number individually configured for each wireless communication device:

mPDCCH-NumRepetition (up to 256 repetitions).

When the wireless communication device transmits on the uplink control channel, it may use repetitions as individually configured by the network node:

pucch-NumRepetitionCE-Format1 (up to 8 (mode A) or 32 (mode B) repetitions), pucch-NumRepetitionCE-Format2 (up to 8 (mode A) or 32 (mode B) repetitions).

Hence, depending on the coverage, wireless communication devices may apply different number of repetitions.

A low complexity UE (e.g., a UE with one receiver, or "Rx") may also be capable of supporting enhanced coverage mode of operation. The coverage level of the UE with regard to a cell may be expressed in terms of a signal level, such as signal quality, signal strength or path loss, with regard to that cell.

An Example Wireless Communication System

FIG. 1 is a simplified block diagram of an exemplary wireless communication system 100 in which one or more embodiments described herein may be implemented. The wireless communication system 100 may be described below with reference to LTE systems, and using LTE terminology. However, the techniques and apparatus described in the context of system 100 may be applicable, with suitable modifications, to any RAT or multi-RAT systems where the UE receives and/or transmit signals (e.g., data), e.g., LTE FDD/TDD, WCDMA/HSPA, GSM/GERAN, Wi Fi, WLAN, CDMA2000, NR, etc. The network node could be configured for operation using more than one cell, e.g., using PCell, SCell, PSCell.

In an example embodiment, the wireless communication system 100 may include at least one network node 120 and at least one wireless communication device 110 served by the network node 120. The number of network nodes 120 and/or the wireless communication devices 110 as shown in FIG. 1 is only illustrative, and not limiting. The network node 120 may be referred to a radio base station, sometimes also referred to in the art as a macro base station, a node B, or B-node, an eNodeB (eNB), and may be sometimes also referred to in the art as a micro/femto/pico base stations, a micro/femto/pico node B, or micro/femto/pico B-node, a micro/femto/pico eNodeB (eNB). Further, the network node 120 could also be any other device in the wireless network, such as a WLAN access point, that could enable similar contributions to the D2D communications herein as an eNodeB does.

The wireless communication devices 110 may be served by cells, and the numbers served by different cells need not be identical. The term "wireless communication device" as used herein may indicate all forms of devices enabled to communicate via a communication network, such as mobile telephones ("cellular" telephones) and laptops with mobile termination, and thus can be, for example, portable, pocket, hand-held devices, such as mobile phones, smart phones, personal digital assistants (PDA); computer-included devices, such as desktops, laptops; vehicles, or other devices, such as meters, household appliances, medical appliances, multimedia devices, etc., which communicate voice and/or data with a radio access network.

Figure 3A:
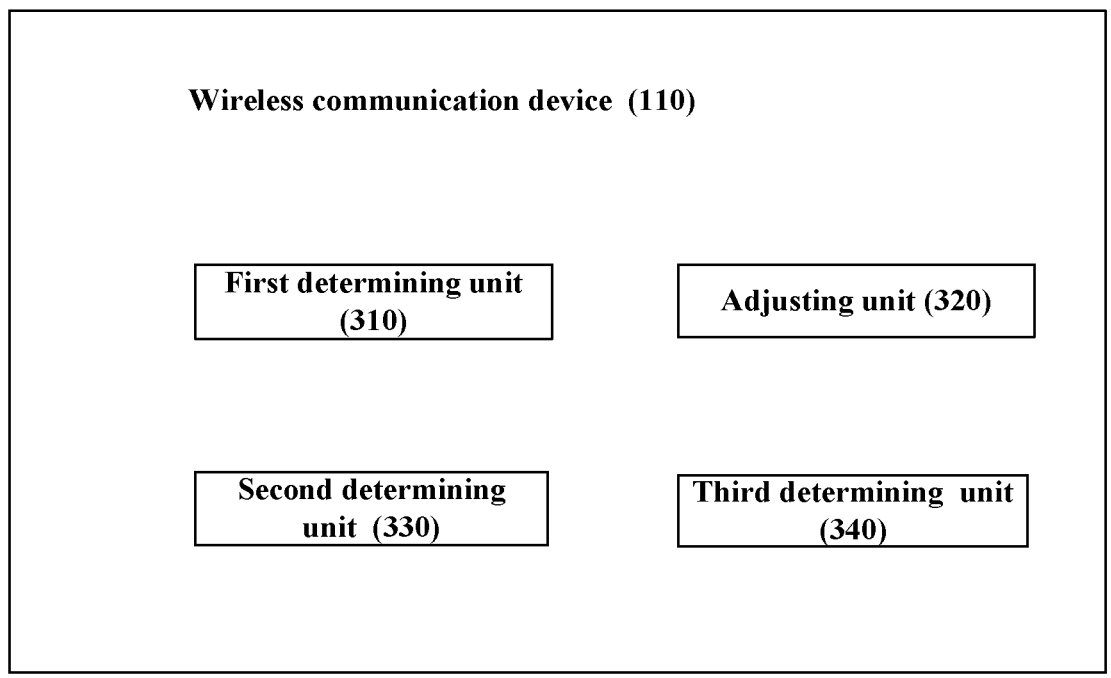
FIG. 3a is a simplified block diagram of a wireless communication device according to an exemplary embodiment.

FIG. 3a is a simplified block diagram of a wireless communication device 110 according to an exemplary embodiment. As shown in FIG. 3a, the wireless communication device 110 may comprise, but not be limited to, an adjusting unit 320, and first, second and third determining units 320, 330 and 340 operatively coupled with each other.

Figure 5A:
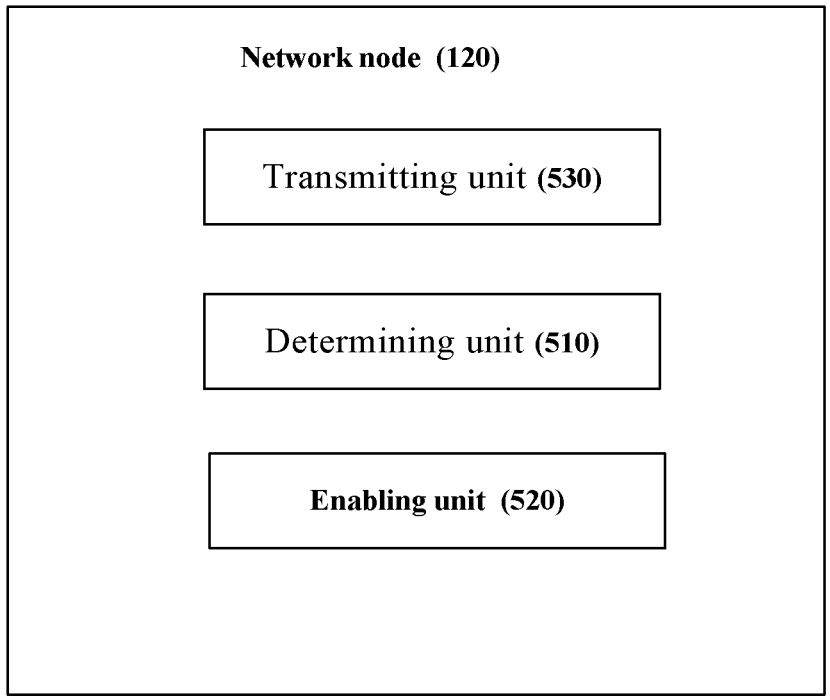
FIG. 5a is a simplified block diagram of a network node according to an exemplary embodiment.

FIG. 5a is a simplified block diagram of a network node 120 according to an exemplary embodiment. As shown in FIG. 5a, the network node 120 may comprise, but not limited to, a determining unit 510, an enabling unit 520 and a transmitting unit 530 operatively coupled with each other.

More details regarding the wireless communication system 100 may be described in connection with FIGS. 1, 3a and 5a hereinafter.

In an embodiment, the network node 120 transmits a reference signal to the wireless communication device 110 via the transmitting unit 530, and the wireless communication device 110 may be configured to operate in an enhanced coverage mode comprising a repetitive transmission of an uplink signal during a repetition period, and to determine a change in a downlink timing from the reference signal via the first determining unit 310. For example, the wireless communication device 110 may determine that downlink timing of the received reference signal from the serving cell has changed with respect to a reference time by a certain amount. The wireless communication device 110 may further be configured to determine whether the repetition period is ongoing via the second determining unit 330. In response to the change in the downlink timing, the wireless communication device 110 may be configured to perform an adjustment of an uplink transmission timing of the uplink signal outside the repetition period via the adjusting unit 320.

In another embodiment, the network node 120 may determine, via the determining unit 510, that the wireless communication device 110 is to be configured to transmit at least two uplink signals with at least partly overlapped repetition periods comprising as a first uplink signal with a certain repetition over a time period T1 and a second uplink signal with a certain repetition over a time period T2, and thus enable, via the enabling unit 520, the wireless communication device 110 to align the repetition periods T1 and T2 according to a predetermined rule, such that an overlap time of the repetition periods T1 and T2 can be maximized or single transmission of the at least two uplink signals can be minimized.

For example, the network node 120 may configure the wireless communication device 110 with information for enabling the wireless communication device 110 to transmit the first uplink signal and the second uplink signal such that the repetition periods T1 and T2 are related by a certain relation, e.g., one or more of:

the repetition periods T1 and T2 start at the same time, e.g., in the same time resource, such as in the same subframe;

the repetition periods T1 and T2 end at the same time, e.g., in the same time resource such as in the same subframe;

the repetition periods T1 and T2 start within a certain time duration ($\Delta 1$), e.g., within X number of time resources such as 5 subframes; and the repetition periods T1 and T2 end within a certain time duration ($\Delta 2$), e.g., within Y number of time resources such as 10 subframes.

In an embodiment, the third determining unit 340 in the wireless communication device 110 may be configured to determine whether the repetition period is longer than one radio resource time unit based on one of: downlink control information (DCI) transmitted by the network node, wherein the DCI contains explicit or implicit information on a number of repetitions to use for the repetitive transmission of the first uplink signals, and radio resource control (RRC) configuration provided by the network node, wherein the RRC configuration contains a number of resources for the wireless communication device in a radio resource time unit, and wherein the number of resources explicitly or implicitly indicates the number of repetitions.

An Example Wireless Communication Device

The timing adjustment behavior of a wireless communication device compliant to the EUTRAN standard is governed by several rules specified in 3GPP 36.133 V12.9.0, section 7.1.2. According to these rules, for non-initial transmission and LTE bandwidth 1.4 MHz (minimum sample rate 1.92 MS/s):

the maximum timing adjustment in one correction shall not exceed 17.5 TS (0.6 µs), the minimum aggregated adjustment rate shall be 7 TS (0.2 µs) per second, and the maximum aggregated adjustment rate shall be 17.5 TS (0.6 µs) per 200 ms.

For initial transmission and LTE bandwidth 1.4 MHz (minimum sample rate 1.92 MS/s):

initial transmission timing error shall be less than ±24*TS (0.8 µs)

By initial transmission the standard refers to the first transmission in a DRX cycle of PUCCH, PUSCH, and SRS or a transmission of PRACH. By non-initial transmission the standard refers to transmissions following the initial transmission.

It is not specified in the standard whether a first transmission in HD-FDD uplink burst of repetitions is to be considered as an initial transmission or not. Since the wireless communication device has not been in a DRX inactivity period prior to the onset of the uplink transmission, and the HD-FDD uplink burst is not a transmission of PRACH, the first transmission in an uplink burst may be considered a non-initial transmission. In such an implementation, any serving cell timing drift that has been detected during the downlink repetition period of the HD-FDD would be corrected during the uplink repetition period, and would be corrected gradually according to the existing rules for non-initial transmissions as summarized above.

Gradual uplink timing changes during an uplink repetition period may be particularly challenging for the network node. The gradual timing change results in a gradual change of (linear) phase of the received signal, and hence changes the perceived radio channel. Accumulation or filtering of channel estimates over the time domain may result in distorted channel estimates, and accumulation of the message part of the signal may likewise lead to a distorted accumulated message. The distortion in turn results in a degraded decoder performance in the network node.

In eMTC operation in FDD or TDD configuration, where downlink and uplink repetition periods may overlap each other, the wireless communication device may acquire new information on the downlink cell timing during an ongoing uplink transmission burst. If the wireless communication device changes the uplink timing during the repetition period, the gradual change in uplink timing will introduce distortion of the accumulated or filtered signals on the network node receiver side as described above, with degraded decoder performance in the network node. One difference from the HD-FDD case is that it can be expected that the frequency drift of the wireless communication device is relatively small, since first, the device has more opportunities to synchronize with the downlink carrier, and secondly, the uplink transmission power amplifier (PA) is operating during the time the UE synchronizes to the downlink carrier, leading to less fluctuations in temperature and hence a more stable frequency reference from the crystal oscillator.

In NB-IoT radio access, it is foreseen that it will be sufficient to use a downlink sample rate of about 240 kS/s, since the NB-IoT downlink system bandwidth is limited to 200 kHz, i.e., considerably less than for eMTC. The lower sample rate potentially leads to more dramatic serving cell downlink timing adjustments, since a one sample adjustment corresponds to ±128 TS (±4.2 µs). For an adjustment of downlink timing of one sample length, it would take up 1.5 seconds (1500 uplink TTIs, derived from maximum change of 17.5 TSper 200 ms) to adapt the uplink timing, if the existing solution from EUTRAN is used also for NB-IoT. During this time, the gradual changes in uplink transmit timing would lead to distortion as discussed above.

Clearly such uplink transmit timing control is not adequate for wireless communication devices that are engaged in communication where repetitions of uplink transmissions are used. The techniques and apparatus described herein address these issues, and include multiple embodiments for a wireless terminal, e.g., a UE, configured for transmitting signals in the uplink with certain number of repetitions. The term signal herein may refer to any of:

a physical signal. A physical signal does not contain higher layer information. Examples of uplink physical signals are SRS, DMRS, any type of reference signal, etc.

a physical channel. A physical channel contains higher layer information, e.g., RRC message, data, MAC, scheduling information, HARQ information, measurement results like CSI, etc. Examples of uplink physical channels are PUCCH, M-PUCCH, NB-IoT PUCCH (a.k.a. NPUCCH), PUSCH, NB-IoT PUSCH (a.k.a NPUSCH), PRACH, NB-PRACH (a.k.a. NPRACH), any type of uplink control or data channel, etc.

Figure 2A:
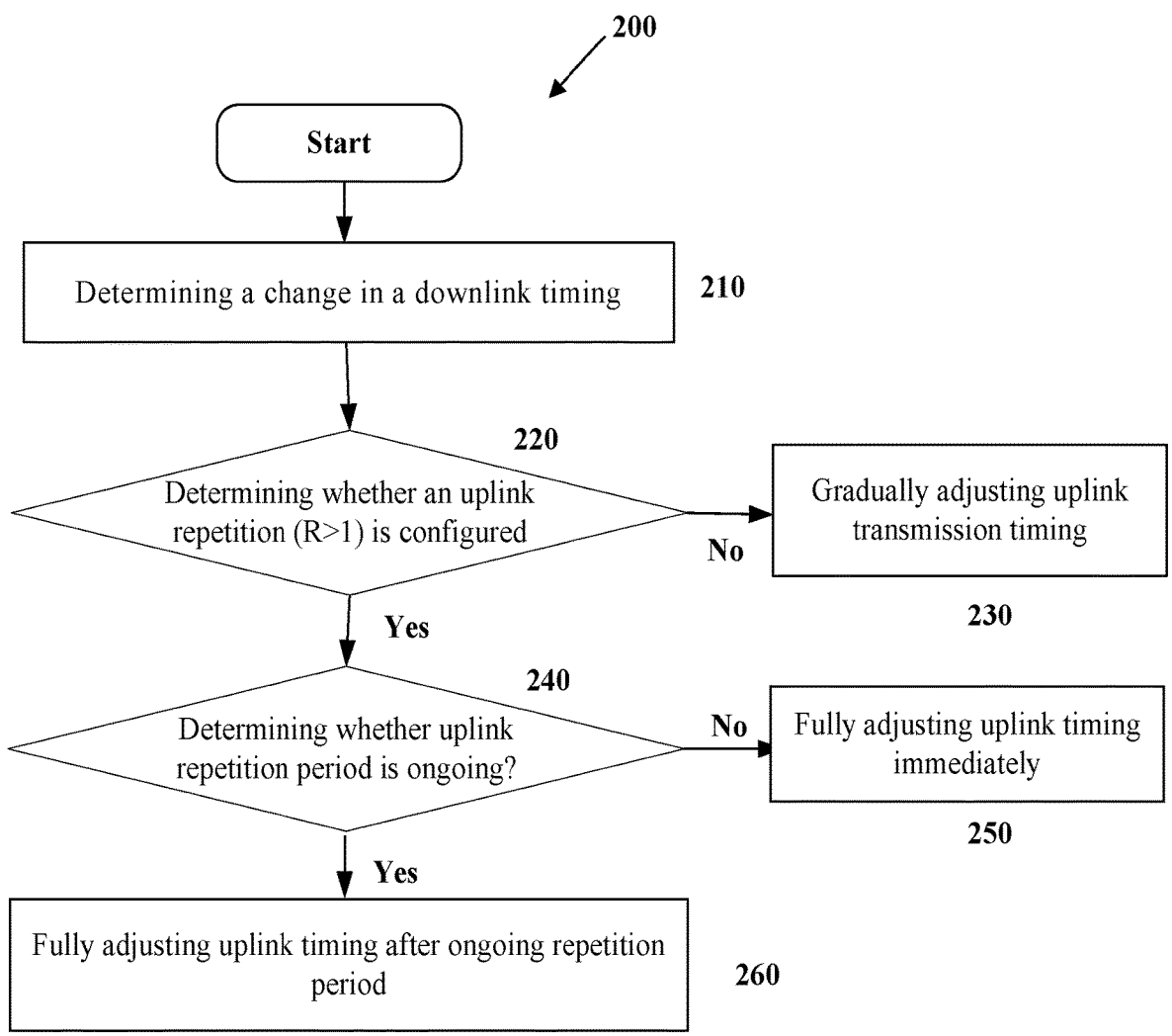
FIG. 2a illustrates a method performed by a wireless communication device for uplink transmission timing control, according to an exemplary embodiment.

FIG. 2a illustrates a method 200, performed by a wireless communication device 110, for uplink transmission timing control adjustment according to an exemplary embodiment, where the wireless communication device 110 is served by the network node 120 and configured to operate in a coverage enhancement mode comprising a repetitive transmission of an uplink signal within a repetition period.

In an embodiment, the wireless communication device 110 is served by the network node 120 and may be configured to operate in a coverage enhancement mode, where the coverage enhancement mode comprises a repetitive transmission of an uplink signal during a repetition period. In this embodiment, the first determining unit 310 may be configured to determine a change in a downlink timing of the network node 120, and the adjusting unit 330 may be configured to, in response to the change in the downlink timing and the repetition period being ongoing, perform an adjustment of an uplink transmission timing outside the ongoing repetition period.

More details regarding the wireless communication device 110 may be described in connection with FIGS. 2a and 3a hereinafter.

As shown in FIG. 2a, the first determining unit 310 may be configured to determine that the downlink timing of the serving cell or the network node 120 has changed, at step 210, and the third determining unit 340 may be configured to check or determine whether uplink repetitions of repetition factor R larger than 1 are configured by the network node 120, at step 220. If no such repetitions are configured, the uplink transmission timing may be gradually adjusted according to the legacy rules on gradual adjustment, such as rules specified in 3GPP TS 36.133 V12.7.0, Section 7.1.2, at step 230.

For example, the rules may comprise one or more of the conditions consisting of:

a. the maximum amount of the magnitude of the timing change in one adjustment shall be Tq seconds, b. the minimum aggregate adjustment rate shall be 7*Ts per second, and c. the maximum aggregate adjustment rate shall be Tq per 200 ms,
d. where Tq is depending on downlink and uplink characteristics and is mapped on the downlink bandwidth, e.g., as in Table 1 below.

TABLE 1

Te Timing Error Limit

| Downlink Bandwidth (MHz) | Te |
|---|---|
| 1.4 | 24 × Ts |
| ≥3 | 12 × Ts |

Note:
Ts is the basic timing unit defined 3GPP TS 36.211

The downlink characteristics comprise any or a combination of: downlink system bandwidth, and coverage enhancement mode of operation, e.g., Mode A or Mode B operation, or an operation of repetitions. The uplink characteristics may comprise any or a combination of: uplink system bandwidth, subcarrier distance or spacing, symbol length and cyclic prefix length.

If, on the other hand, the third determining unit 340 determines that uplink repetitions are configured, the second determining unit 330 may be configured to check whether it is currently engaged in an uplink transmission where messages are repeated, at step 240. If not, the adjusting unit 320 may be configured to fully adjust the uplink transmission timing substantially immediately in response to the changed downlink timing in the cell or the network node 120, at step 250.

For example, in response to a change in the downlink timing and the repetition period being not ongoing, the uplink transmission timing may be adjusted to within ±Te seconds before the uplink repetition period begins, and shall remain constant during the next uplink repetition period, where Te is depending on the above downlink and uplink characteristics, and the uplink transmission timing shall remain constant during the uplink repetition period.

If, on the other hand, the second determining unit 330 determines that the wireless communication device 110 is engaged in an uplink transmission, the adjusting unit 320 may be configured to postpone the uplink transmission timing adjustment until the current uplink transmission period has ended, and preferably substantially immediately thereafter, to be prepared for the next uplink transmission as early as possible, at step 260.

For example, in response to a change in the downlink timing and the repetition period being ongoing, the uplink transmission timing may be adjusted to within ±Te seconds before the next uplink repetition period or next uplink transmission begins and after the ongoing uplink transmission period has ended, and shall remain constant during the next ongoing uplink repetition period, where Te is depending on the above downlink and uplink characteristics.

At step 210, the first determining unit 310 may be further configured to determine a change in a downlink timing of a reference signal received at the wireless communication device from the network node with respect to a reference time. For example, the first determining unit 310 may be further configured to determine a relative change of timing of one or more reference signals broadcasted by the network node on the downlink, to a timing predicted for the reference signals by the wireless communication device based on one or more previous reference signals.

At step 220, the third determining unit 340 may be further configured to check whether a repetition period is longer than one radio resource time unit, based on DCI transmitted by the network node, where the DCI contains explicit or implicit information on the number of repetitions to use for a granted uplink transmission, e.g., applicable for PUSCH, depending on DCI and maxRepetitions. Besides, this checking step may be based on RRC configuration provided by the network node, where the RRC configuration contains the number of resources for the wireless communication device in a radio resource time unit, and where said number of resources explicitly or implicitly indicates the number of repetitions, e.g., applicable for PUCCH, depending on #RBs and maxRepetitions. One radio resource time unit may correspond to one EUTRAN subframe (1 ms), e.g., applicable for eMTC, or to two EUTRAN subframes (2 ms), e.g., applicable for NB-IoT3.75 kHz option.

An Example Method in a UE Configured to Transmit One Signal with Repetition

The presently disclosed techniques include methods implemented in a wireless communication device 110, such as UE, which is served by the network node and is configured to transmit one uplink signal with repetition during a repetition period. These methods may include, for example, the steps of: determining, by the first determining unit 310, a change in a downlink timing of the network node, 210; and in response to the change in the downlink timing and the ongoing repetition period, performing, by the adjusting unit 320, an adjustment of an uplink transmission timing outside the ongoing repetition period, 260. The method may further comprise the steps of: determining whether the UE is configured to transmit a first uplink signal with a certain repetition over a time period, T0; determining an adjustment time resource in which the uplink transmit timing for transmitting the first signal is adjusted, which adjustment time resource is determined in response to the determined change in the downlink reception timing and depends on whether the UE is configured with the first signal with or without repetitions (e.g., adjustment time resource such as a subframe occurs immediately after T0 if repetition is configured).

These example methods concern a new UE behavior in terms of UE transmit timing adjustment. A UE that is configured to transmit any of various uplink signals (e.g., PRACH, SRS, PUSCH, M-PUCCH, NB-PUSCH, NB-PUCCH, etc) on the uplink using a repetition factor R that is larger than one, i.e., R>1, shall consider the onset of each separate repetition period to be an initial transmission. Moreover, in the cases of FDD or TDD mode of operation, the UE shall not, when R>1, carry out autonomous changes of the uplink timing during the current repetition burst, i.e., uplink transmission period or duration over which an uplink signal being transmitted is repeated.

This new UE behavior is needed because when message repetition is used it is undesirable to have the UE changing the uplink transmit timing during the repetition period. Any change in the UE uplink timing may destroy the channel estimation at the base station receiver. This in turn will prevent the base station receiver from receiving or correctly receiving signals transmitted by the UE with repetition.

In this embodiment, it is assumed that the UE is configured to transmit one signal with repetition over the entire repetition period (T0). For example, the UE can be configured to transmit only PUSCH with 32 repetitions over 32 consecutive uplink time resources, e.g., 32 subframes, 32 TTIs, 32 interleaving time periods, etc. This corresponds to a repetition period (T0) of 32 ms for FDD. However, T0 in case of HD-FDD and TDD will be longer than 32 milliseconds (ms); the actual value of T0 would depend on the number of uplink subframes available in a frame.

By handling each uplink repetition period as an initial transmission, and not allowing UE-autonomous uplink timing corrections during an ongoing uplink repetition period, distortion on the network node receiver side can be reduced.

An Example Method in a UE Configured to Transmit Signals Both with and without Repetitions The presently disclosed techniques include methods implemented in a wireless communication device, such as UE, for adjusting uplink timing when configured to transmit combination of signals with and without repetitions during a repetition period. In these methods, the UE is configured to operate in a coverage enhancement mode comprising a repetitive transmission of a first uplink signal during a first repetition period and a transmission of a second uplink signal without a repetition. These methods include determining, e.g., by the first determining unit 310, a change in a downlink timing of the serving network node or cell, at step 210, and in response to the change in the downlink timing and the ongoing repetition period, performing, e.g., by the adjusting unit 320, an adjustment of an uplink transmission timing of the first uplink signal outside the first repetition period, at step 260. The step of performing may further configure the second uplink signal with the same uplink transmission timing as that of the first uplink signal.

In these methods, it is assumed that the UE is configured to transmit at least one first signal with repetition over a repetition period (T0) and also another second signal during the repetition period of the first signal, i.e., during T0. For example, the UE can be configured to transmit PUSCH with 32 repetitions over T0 and the UE may also perform at least one random access transmission during T0. It is assumed that the UE performs RA during T0 with one transmission attempt, i.e., an original transmission only, without repetitions.

The UE may initiate a RA transmission autonomously or in response to a request received from the network node. The UE may perform a RA transmission for one or more of the following reasons, e.g., for performing or enabling eNB to perform positioning measurement such as TA, UE Rx-Tx time difference, eNB Rx-Tx time difference, etc. Thus, a RA transmission can, in principle, occur at any time uncorrelated with the first signal.

According to some embodiments, the UE is not allowed to perform any autonomous uplink timing corrections even when transmitting the second signal during an ongoing uplink repetition period, T0 of the first signal. On the other hand, the UE may adjust its timing autonomously at the start or at the end of the current repetition period of the first signal. More specifically, the UE may transmit the RA during T0 using the same timing which is being used for transmitting PUSCH. This timing was the most favorable at the start of T0.

This corresponds to a repetition period (T0) of 32 ms for FDD. However, T0 in case of HD-FDD and TDD will be longer than 32 ms; the actual value of T0 would depend on the number of uplink subframes available in a frame.

An Example Method in a UE Configured to Transmit Multiple Signals with Repetitions, During Overlapping Repetition Periods The presently disclosed techniques include methods implemented in a wireless communication device 100, such as a UE, of adjusting uplink timing when the wireless communication device 100 is configured to transmit multiple signals with repetitions during overlapping repetition periods. For example, the UE may be configured to operate in a coverage enhancement mode comprising repetitive transmissions of at least two uplink signals with at least partly overlapping repetition periods comprising a first uplink signal with a certain repetition over a time period T1 and a second uplink signal with a certain repetition over a time period T2.

These methods may comprise: determining, by the first determining unit 310, a change in a downlink timing of the serving network node or cell, at step 210, and in response to the change in the downlink timing and the ongoing repetition period(s), performing, by the adjusting unit 320, uplink transmission timings outside both of the first and second repetition periods, at step 260. The methods may further comprise a step of determining an adjustment time resource in which the uplink transmit timing for transmitting at least one of the first signal and the second signal is adjusted, which adjustment time resource is determined in response to the determined change in the downlink reception timing and further depends on the relations between the starting times of T1 and T2 and/or terminating times of T1 and T2 (e.g., an adjustment time resource such as a subframe occurs immediately after T2, if T2 terminates after T1).

In these embodiments, it is assumed that the UE is configured to transmit at least one first signal with a certain repetition over a first repetition period T1 and at least a second signal with a certain repetition over a second repetition period T2. It is further assumed that T1 and T2 at least partly overlap. For example, the UE can be configured to transmit a first signal, such as PUSCH, with 32 repetitions over T1. The UE may also be configured to transmit a second signal, such as a random access, with a certain number of repetitions during T2. In yet another scenario it is assumed that the UE performs RA during T0 with one transmission attempt, i.e., original transmission only without repetitions (R=1).

As noted above, a UE may initiate RA transmission autonomously or in response to a request received from the network node. The UE may perform RA transmission for one or more of the following reasons, e.g., for performing or enabling eNB to perform positioning measurement such as TA, UE Rx-Tx time difference, eNB Rx-Tx time difference, etc.

According to these embodiment of the disclosed method the UE behavior can be further described as follows. The UE is not allowed to perform any autonomous uplink transmit timing corrections or adjustments during ongoing uplink repetition periods of any of the uplink signals but is allowed to autonomously adjust its uplink transmit timing when no repetition period is ongoing, such as: before the beginning of the repetition period of a signal with the earliest starting time compared to the starting times of repetition periods of other signals overlapping in time, or after the end of the repetition period of a signal with the latest terminating time compared to the terminating times of repetition periods of other signals overlapping in time.

The above UE behavior is elaborated with the example comprising the first and second signal transmission with at least partly overlapping repetition periods of T1 and T2 respectively. Assume that T1 starts before T2 and T1 ends before T2, i.e., T2 terminates after T1. In this embodiment, the UE is not allowed to autonomously adjust its uplink timing from the start of T1 and until the end of T2. However, the UE is allowed to autonomously adjust or change its uplink transmit timing just before T1 or just after T2.

Figure 2B:
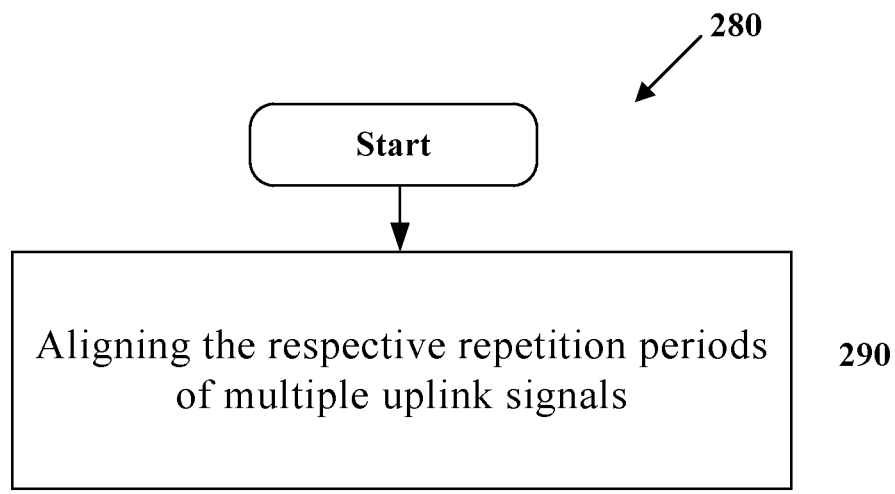
FIG. 2b illustrates a method performed by a wireless communication device for uplink transmission timing control, according to another exemplary embodiment.

An Example Method in a UE of Configuring Uplink Signals with Repetitions to Enhance UE Uplink Timing Adjustment Procedures FIG. 2b illustrates a method 280 performed by a wireless communication device 110 for uplink transmission timing control, according to other exemplary embodiments of the presently disclosed techniques. The method 280 may be implemented in a UE (e.g., involving a RA transmission, etc.). In this method, the wireless communication device 110 is served by a network node 120 and configured to operate in a coverage enhancement mode, wherein the coverage enhancement mode comprises repetitive transmissions of multiple uplink signals with respective repetition periods.

As shown in FIG. 2b, the method 280 may comprise aligning the respective repetition periods by shifting in time at least one of start or end points of the respective repetition periods according to a predetermined rule, such that an overlap time of the respective repetition periods is maximized or single transmission of the multiple uplink signals is minimized, at step 290.

The predetermined rule comprises one of:
a. the respective repetition periods to start at the same time;
b. the respective repetition periods to end at the same time;
c. the respective repetition periods to start within a first time duration ($\Delta 1$), e.g., within a number of X time resources such as 5 subframes; and
e. the respective repetition periods to end within a second time duration $\Delta 2$), e.g., within a number of Y time resources such as 10 subframes.

The above relations between the repetition periods can be implementation specific, pre-defined or configured at the UE by the network node.

For example, assume that the UE is configured by the network node to transmit the first signal, PUSCH, with a certain repetition over the repetition period of T1. During T1, the network node may further request the UE to transmit a second signal, such as a random access, with a certain repetition over the repetition period of T2. As a special case, the repetition for the second signal may be 1, i.e., R=1. In an example implementation, the UE may be configured to transmit RA with all repetitions by the end of T1, i.e., T2 ends in the single and last time resource just before or after the T1. By scheduling T2 at the end of T1, the UE is allowed to adjust its uplink transmit timing immediately after T1, or one time resource after T1. In other words, the UE transmit timing adjustment is not delayed or the adjustment is applied with minimal delay when there are two or more signals configured for uplink transmissions with overlapping repetition periods. In another example, the transmission during T1 has precedence over the transmission in T2, and since T2 extends over the remaining time of T1, the UE can correct the timing at the start of T1. However, the UE would not be allowed to correct the timing at the onset of T2, since there would be a part of T1 left after T2 had been started.

The aim of this approach is to allow alignment between the repetition periods of multiple uplink signals as much as possible. This alignment enables the UE to adjust the uplink transmit timing immediately or with a shorter delay after the end of the repetition period of each uplink signal. In other words, the overlap time of the repetition periods (Ta, Tb) is maximized, or single transmission of uplink signals is minimized.

Figure 3B:
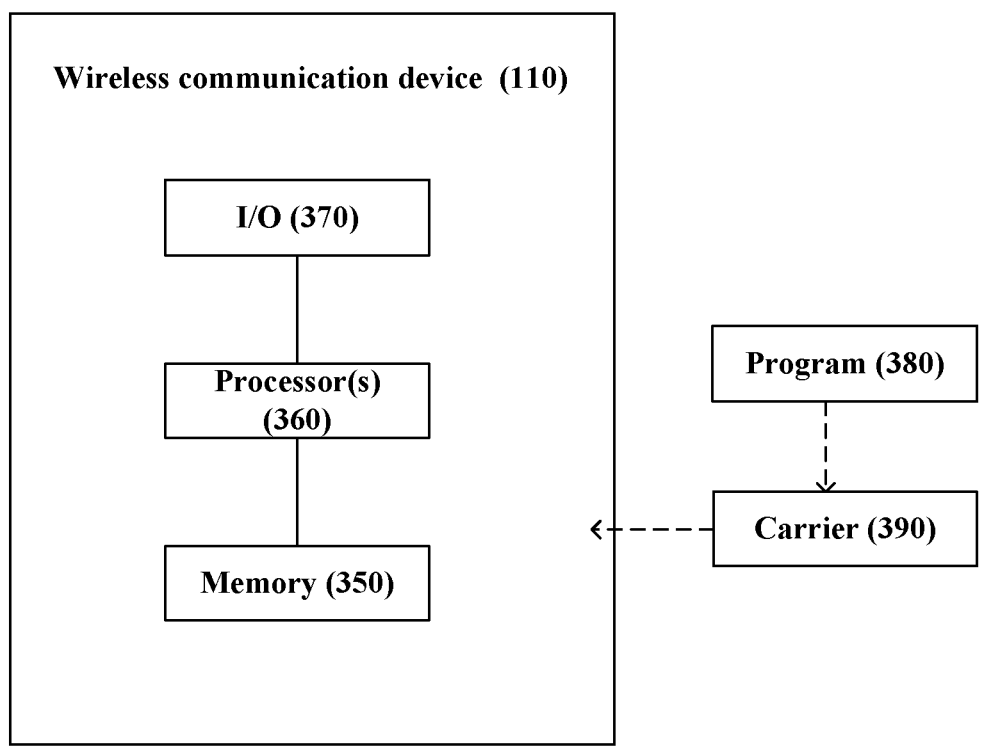
FIG. 3b is a simplified block diagram of a wireless communication device according to another exemplary embodiment.

FIG. 3b is a simplified block diagram of a wireless communication device 110 that may be configured to carry out one or more of the techniques described herein. As shown in FIG. 3b, the wireless communication device 110 may comprise, but is not limited to, an Input/Output Interface 370, processor(s) 360, and a memory 350, operatively coupled with each other.

The memory 350 may comprise, but be not limited to, a volatile (e.g., RAM) and/or non-volatile memory (e.g., a hard disk or flash memory). In an embodiment, the memory 350 may be configured to store a computer program, which when executed by the processor(s) 360, causes to the processor 360 to perform any method performed in the wireless communication device 110. The combination of processor(s) 360 with such a memory 350 may be referred to as a processing circuit; it will be appreciated that when the memory 350 stores a computer program for carrying out one or more of the techniques described herein, the processing circuit is thereby configured to carry out those one or more techniques. In some embodiments, the computer program can be stored in a remote location, for example computer program product 380, and be accessible by the processor(s) 360 via, for example carrier 390.

The computer program product 380 can be distributed and/or stored on a removable computer readable media, e.g., diskette, CD (Compact Disk), DVD (Digital Video Disk), flash or similar removable memory media (e.g., compact flash, SD secure digital, memory stick, miniSD, MMC multimedia card, smart media), HD-DVD (High Definition DVD), or Bluray DVD, USB (Universal Serial Bus) based removable memory media, magnetic tape media, optical storage media, magneto-optical media, bubble memory, or distributed as a propagated signal via a network (e.g., Ethernet, ATM, ISDN, PSTN, X.25, Internet, Local Area Network (LAN), or similar networks capable of transporting data packets to the infrastructure node).

Network Node Side

Figure 4:
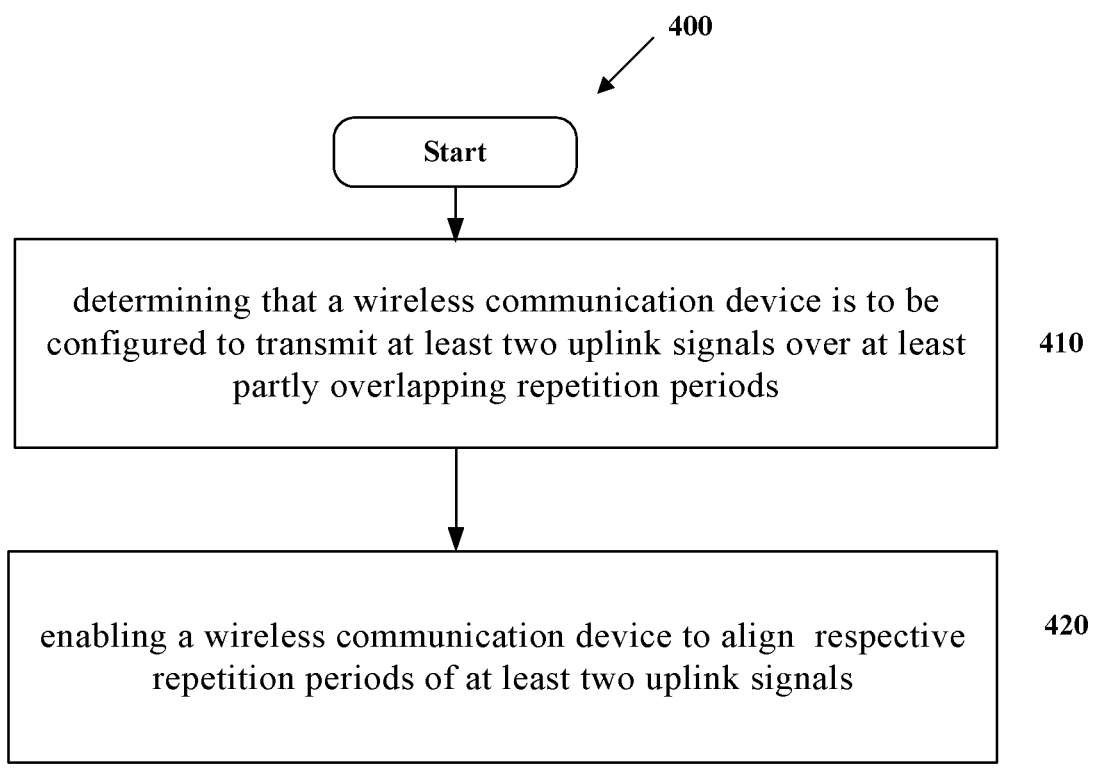
FIG. 4 illustrates a method performed by a network node for uplink transmission timing control, according to an exemplary embodiment.

FIG. 4 illustrates an example method 400 performed on the network side of the wireless communication system, such as in a network node 120, a cloud, or the like, for uplink transmission timing control, according to an exemplary embodiment. The network node 120, for example, may be configured to enhance an uplink transmission timing adjustment procedure for a wireless communication device 110 served by the network node 120. As shown in FIG. 5a, the network node 120 may comprise, but not limited to, a determining unit 510, an enabling unit 520 and a transmitting unit 530.

In an embodiment, the determining unit 510 may be configured to determine that the wireless communication device 110 is to be configured to transmit at least two uplink signals over at least partly overlapping repetition periods. The enabling unit 520 may be configured to enable the wireless communication device 110 to align the respective repetition periods of the at least two uplink signals. More details regarding the network node 120 may be described in connection with FIGS. 4, 5a and 5b hereinafter.

As shown in FIG. 4, a method 400 for enhancing an uplink transmission timing adjustment procedure for a wireless communication device 110 may comprise the steps of: determining, by the determining unit 510, that the wireless communication device 100 is to be configured to transmit at least two uplink signals over at least partly overlapping repetition periods, e.g., as shown at step 410 of FIG. 4; and enabling, by the enabling unit 520, the wireless communication device 110 to align the respective repetition periods of the at least two uplink signals, as shown at step 420 of FIG. 4.

At step 420, the enabling unit 520 may be further configured to enable the wireless communication device 110 to align the respective repetition periods by shifting in time at least one of the start or end points of the respective repetition periods according to a predetermined rule, such that an overlap time of the respective repetition periods is maximized or single transmission of the multiple uplink signals is minimized. The predetermined rule comprises one of:

a. the respective repetition periods to start at the same time;
b. the respective repetition periods to end at the same time;
c. the respective repetition periods to start within a first time duration ($\Delta 1$), e.g., within a number of X time resources such as 5 subframes; and
d. the respective repetition periods to end within a second time duration ($\Delta 2$), e.g., within a number of Y time resources such as 10 subframes.

The above relations between the repetition periods can be implementation specific, pre-defined or configured at the UE by the network node.

For example, assume that the UE is configured by the network node to transmit the first signal, PUSCH, with a certain repetition over the repetition period of T1. During T1 the network node may further request the UE to transmit a second signal, random access, with a certain repetition over the repetition period of T2. As a special case, the repetition for the second signal may be 1, i.e., R=1. In one example implementation, the UE may be configured to transmit RA with all repetitions by the end of T1, i.e., T2 ends in the single and last time resource just before or after the T1. By scheduling T2 at the end of T1, the UE is allowed to adjust its uplink transmit timing immediately after T1, or one time resource after T1. In other words, the UE transmit timing adjustment is not delayed or the adjustment is applied with minimal delay when there are two or more signals configured for uplink transmissions with overlapping repetition periods. In other embodiments, the transmission during T1 has precedence over the transmission in T2, and since T2 extends over the remaining time of T1, the UE can correct the timing at the start of T1. However, the UE would not be allowed to correct the timing at the onset of T2, since there would be a part of T1 left after T2 had been started.

The aim of this approach is to allow alignment between the repetition periods of multiple uplink signals as much as possible. This alignment enables the UE to adjust the uplink transmit timing immediately or with a shorter delay after the end of the repetition period of each uplink signal. In other words, the overlap time of the repetition periods (Ta, Tb) is maximized or single transmission of uplink signals is minimized.

Figure 5B:
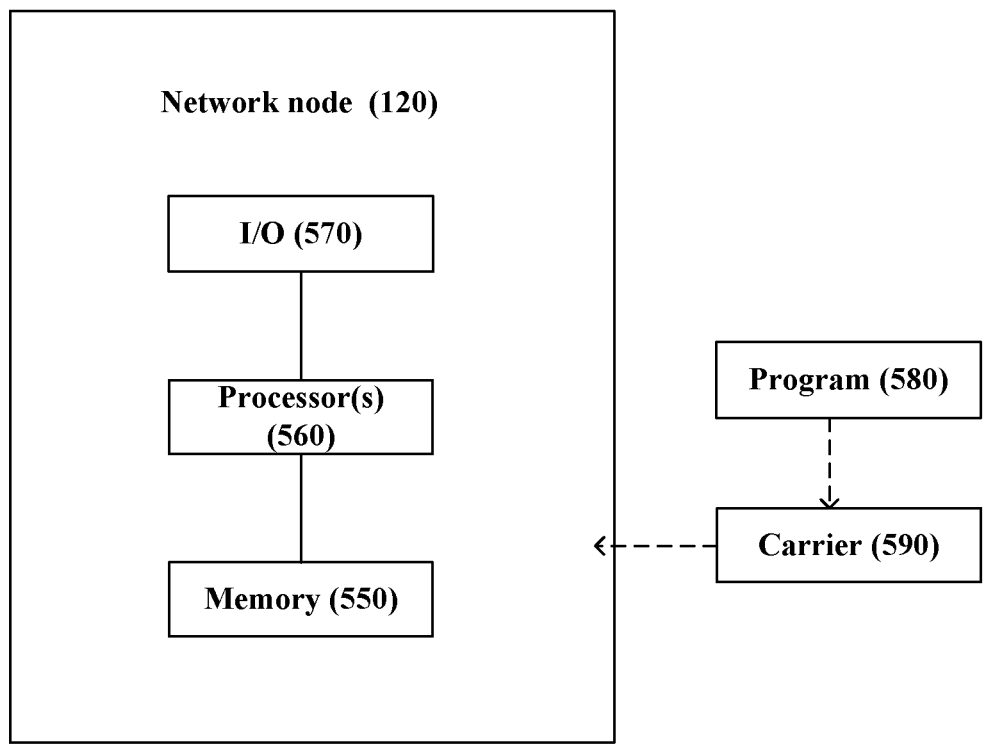
FIG. 5b is a simplified block diagram of a network node according to another exemplary embodiment.

FIG. 5b is a simplified block diagram of an example network node 120, which may be configured to carry out one or more of the techniques described herein. As shown in FIG. 5b, the network node 120 may comprise, but is limited to, an Input/Output Interface 570, processor(s) 560, and a memory 550, operatively coupled with each other.

The memory 550 may comprise, but not be limited to, a volatile (e.g., RAM) and/or non-volatile memory (e.g., a hard disk or flash memory). In an embodiment, the memory 550 may be configured to store a computer program, which when executed by the processor(s) 560, causes the processor(s) 560 to perform any method performed in the network node 120. The combination of processor(s) 560 with such a memory 550 may be referred to as a processing circuit; it will be appreciated that when the memory 550 stores a computer program for carrying out one or more of the techniques described herein, the processing circuit is thereby configured to carry out those one or more techniques. In some embodiments, the computer program can be stored in a remote location, for example computer program product 580, and be accessible by the processor 560 via, for example carrier 590.

The computer program product 580 can be distributed and/or stored on a removable computer readable media, e.g., diskette, CD (Compact Disk), DVD (Digital Video Disk), flash or similar removable memory media (e.g., compact flash, SD secure digital, memory stick, miniSD, MMC multimedia card, smart media), HD-DVD (High Definition DVD), or Bluray DVD, USB (Universal Serial Bus) based removable memory media, magnetic tape media, optical storage media, magneto-optical media, bubble memory, or distributed as a propagated signal via a network (e.g., Ethernet, ATM, ISDN, PSTN, X.25, Internet, Local Area Network (LAN), or similar networks capable of transporting data packets to the infrastructure node).

Although the method disclosed in this specification is exemplified for the case when the communication takes place between a network node and a UE, the same method could also be applied when the communication occurs between at least two nodes, node 1 and node 2.

Examples of the first node are NodeB, MeNB, SeNB, a network node belonging to MCG or SCG, base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g., MSC, MME etc), O&M, OSS, SON, positioning node (e.g., E-SMLC), MDT, etc.

Examples of the second node are target device, device to device (D2D) UE, proximity capable UE (also referred to as ProSe UE), machine-type UE or UE capable of machine to machine (M2M) communication, PDA, PAD, Tablet, mobile terminals, smart phone, laptop embedded equipped (LEE), laptop mounted equipment (LME), USB dongles, etc.

In case of ProSe (also known as D2D, sidelink) operation, the communication takes place between two ProSe capable UEs. The ProSe operation by a UE is in a half-duplex mode, i.e., the UE can either transmit ProSe signals/channels or receive ProSe signals/channels. The ProSe UEs can also act as ProSe relay UEs whose tasks are to relay some signals between ProSe UEs, but also to other nodes (e.g., network node). There is also associated control information for ProSe, some of which is transmitted by ProSe UEs and the other is transmitted by eNBs (e.g., ProSe resource grants for ProSe communication transmitted via cellular downlink control channels). The ProSe transmissions may occur on resources which are configured by the network or selected autonomously by the ProSe UE. The ProSe transmissions (e.g., PSDCH) include several (e.g., 3) retransmissions that are transmitted on consecutive subframes. The retransmissions or repetitions are needed to achieve good SD-RSRP measurement performance. The SD-RSRP measurement is used to perform ProSe relay selection by ProSe UEs.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

Throughout the description, embodiments of the present disclosure have been presented through flow diagrams. It will be appreciated that the order of transactions and transactions described in these flow diagrams are only intended for illustrative purposes and not intended as a limitation of the present disclosure. One having ordinary skill in the art would recognize that variations can be made to the flow diagrams without departing from the broader spirit and scope of the disclosure as set forth in the following claims.

Abbreviations Explanation

BW Bandwidth
CE Coverage enhancement
CP Cyclic prefix
DCI Downlink control information
DFT Discrete Fourier transform
DMRS Demodulation reference signal
DRX Discontinuous reception
eMTC Evolved MTC
EUTRA(N) Evolved universal terrestrial radio access (network)
FDD Frequency division duplex
GERAN GSM EDGE radio access network
GSM Global system for mobile communication
HARQ Hybrid automatic repeat request
HD-FDD Half-duplex FDD
IoT Internet of things
kS/s kilo-samples per second
LTE Long term evolution of UMTS
MAC Media access control
MIB Master information block
M-PDCCH Machine-type PDCCH
MTC Machine-type communication
NB-IoT Narrowband IoT
NB-MIB Narrowband MIB
NB-M-PDCCH Narrowband M-PDCCH
NB-PBCH Narrowband PBCH
NB-PDCCH Narrowband PDCCH
NB-PDSCH Narrowband PDSCH
NB-PSS Narrowband PSS
NB-SSS Narrowband SSS
NB-PUCCH Narrowband PUCCH
NB-PUSCH Narrowband PUSCH
NTA Non-time alignment
OFDM Orthogonal frequency division multiplexing
PA Power amplifier
PBCH Physical broadcast channel
PDCCH Physical downlink control channel
PDSCH Physical downlink shared channel
PRACH Physical random access channel
PRB Physical resource block
PSS Primary synchronization signal
PUCCH Physical uplink control channel
PUSCH Physical uplink shared channel
RA Random access
RRC Radio resource control
Rx Receive(r)
SRS Sounding reference signal
SSS Secondary synchronization signal
TA Timing advance
TAC Timing advance command
TAG Timing advance group
TDD Time division duplex
Tx Transmit(ter)
TTI Transmission time interval
UE User equipment
UL Uplink

What is claimed is:

1. A wireless communication system comprising:
a wireless communication device configured to support a coverage enhancement mode comprising a repetitive transmission of a first uplink signal during a first repetition period; and
a network node serving the wireless communication device, the network node comprising a transmitter configured to transmit a reference signal to the wireless communication device,
wherein the wireless communication device comprises a processing circuit configured to:
determine a change in a downlink timing based on the reference signal;
determine whether the first repetition period is ongoing; and,
in response to the change in the downlink timing and the first repetition period being ongoing, perform an adjustment of an uplink transmission timing outside the first repetition period.

2. The wireless communication system of claim 1, wherein the network node comprises a processing circuit configured to:
determine that the wireless communication device to be configured to transmit a second uplink signal during a second repetition period at least partly overlapping the first repetition period; and
enable the wireless communication device to align the first repetition period and the second repetition period according to a predetermined rule, such that an overlap time of the first repetition period and the second repetition period is maximized or single transmission of the multiple uplink signals is minimized.

3. The wireless communication system of claim 2, wherein the predetermined rule comprises one of:
the first repetition period and the second repetition period to start at a same time;
the first repetition period and the second repetition period to end at a same time;
the first repetition period and the second repetition period to start within a first time duration; and
the first repetition period and the second repetition period to end within a second time duration.

4. The wireless communication system of claim 1, where the processing circuit of the wireless communication device is configured to determine whether the first repetition period is longer than one radio resource time unit, based on one of:
downlink control information (DCI) transmitted by the network node, wherein the DCI contains explicit or implicit information on a number of repetitions to use for the repetitive transmission of the first uplink signals, and
radio resource control (RRC) configuration provided by the network node, wherein the RRC configuration contains a number of resources for the wireless communication device in a radio resource time unit, and wherein the number of resources explicitly or implicitly indicates the number of repetitions.

5. A method for an uplink transmission timing adjustment in a wireless communication device served by a network node and configured to support a coverage enhancement mode, wherein the coverage enhancement mode comprises a repetitive transmission of a first uplink signal during a first repetition period, the method comprising:
determining a change in a downlink timing;
determining whether the first repetition period is ongoing; and in response to the change in the downlink timing and the first repetition period being ongoing, performing an adjustment of an uplink transmission timing outside the first repetition period.

6. The method of claim 5, wherein determining a change in a downlink timing comprises:
determining a change in a downlink timing of a reference signal received at the wireless communication device from the network node with respect to a reference time.

7. The method of claim 6, wherein determining a change in a downlink timing comprises:
determining a relative change of timing of one or more reference signals broadcasted by the network node on the downlink, to a timing predicted for the reference signals by the wireless communication device based on one or more previous reference signals.

8. The method of claim 5, wherein the uplink transmission timing is adjusted to within ±Te seconds before a next uplink transmission begins and after the ongoing uplink transmission period has ended, and wherein Te is indicative of a timing error limit value and depends upon downlink and uplink characteristics.

9. The method of claim 8, wherein the uplink characteristics comprises any or a combination of uplink system bandwidth, subcarrier distance, symbol length, cyclic prefix length, and wherein the downlink characteristics comprises any or a combination of downlink system bandwidth, and an operation mode of repetition.

10. The method of claim 5, wherein the coverage enhancement mode further comprises a transmission of a second uplink signal without a repetition, and wherein the step of performing further comprises:
configuring the second uplink signal with a same uplink transmission timing as that of the first uplink signal.

11. The method of claim 5, wherein the coverage enhancement mode further comprises a repetitive transmission of a second uplink signal with a second repetition period at least partly overlapped with the first repetition period, and wherein the step of performing further comprises:
in response to the change in the downlink timing, performing the adjustment of the uplink transmission timing outside both of the first and second repetition periods.

12. The method of any claim 5, wherein if the first repetition period is not ongoing, the uplink transmission timing is adjusted to within ±Te seconds before the first repetition period begins, and
wherein Te is indicative of a timing error limit value and depends upon downlink and uplink characteristics.

13. The method of claim 5, further comprising determining whether the first repetition period is longer than one radio resource time unit, based on one of:
downlink control information (DCI) transmitted by the network node, wherein the DCI contains explicit or implicit information on a number of repetitions to use for the repetitive transmission of the first uplink signals, and
radio resource control (RRC) configuration provided by the network node, wherein the RRC configuration contains a number of resources for the wireless communication device in a radio resource time unit, and wherein the number of resources explicitly or implicitly indicates the number of repetitions.

14. The method of claim 13, wherein if the first repetition period is not longer than one radio resource time unit, the uplink transmission timing is adjusted according to a rule comprising the following conditions:

a. a maximum amount of a magnitude of a timing change in one adjustment shall be Tq seconds;
b. a minimum aggregate adjustment rate shall be 7*Ts per second, wherein Ts is a basic timing unit; and
c. the maximum aggregate adjustment rate shall be Tq per 200 ms,
wherein Tq is depending on downlink and uplink characteristics.

15. The method of claim 14, wherein Tq is mapped on a downlink bandwidth according to a table of:

| Downlink Bandwidth (MHz) | Tq |
| --- | --- |
| 1.4 | 17.5 Ts |
| 3 | 9.5 Ts |
| 5 | 5.5 Ts |
| ≥10 | 3.5 Ts. |

16. The method of claim 13, wherein the one radio resource time unit corresponds to one Evolved universal terrestrial radio access network (EUTRAN) subframe or two EUTRAN subframes.

17. The method of claim 5, wherein the wireless communication device comprises at least one of:
an Evolved Machine-type communication (eMTC) device; and
a Narrowband Internet-of-things (NB-IoT) device.

18. A method for an uplink transmission timing adjustment in a wireless communication device served by a network node and configured to support a coverage enhancement mode, wherein the coverage enhancement mode comprises repetitive transmissions of multiple uplink signals with respective repetition periods, the method comprising:
aligning the respective repetition periods by shifting in time at least one of start or end points of the respective repetition periods according to a predetermined rule, such that an overlap time of the respective repetition periods is maximized or single transmission of the multiple uplink signals is minimized.

19. The method of claim 18, wherein the predetermined rule comprises one of:
the respective repetition periods to start at the same time;
the respective repetition periods to end at the same time;
the respective repetition periods to start within a first time duration; and
the respective repetition periods to end within a second time duration.

20. A wireless communication device served by a network node and configured to support a coverage enhancement mode, wherein the coverage enhancement mode comprises a repetitive transmission of a first uplink signal during a first repetition period, the wireless communication device comprising a processing circuit configured to:
determine a change in a downlink timing;
determine whether the first repetition period is ongoing; and,
in response to the change in the downlink timing and the first repetition period being ongoing, perform an adjustment of an uplink transmission timing outside the first repetition period.

21. The wireless communication device of claim 20, wherein the processing circuit is further configured to:
determine a change in a downlink timing of a reference signal received at the wireless communication device from the network node with respect to a reference time.

22. The wireless communication device of claim 21, wherein the processing circuit is further configured to:
  determine a relative change of timing of one or more reference signals broadcasted by the network node on the downlink, to a timing predicted for the reference signals by the wireless communication device based on one or more previous reference signals.

23. The wireless communication device of claim 20, wherein the uplink transmission timing is adjusted to within ±Te seconds before a next uplink transmission begins and after the ongoing uplink transmission period has ended, and wherein Te is indicative of a timing error limit value and depends upon downlink and uplink characteristics.

24. The wireless communication device of claim 23, wherein the uplink characteristics comprise any or a combination of uplink system bandwidth, subcarrier spacing, symbol length, cyclic prefix length, and wherein the downlink characteristics comprises any or a combination of downlink system bandwidth, and an operation mode of repetition.

25. The wireless communication device of claim 20, wherein the coverage enhancement mode further comprises a transmission of a second uplink signal without a repetition, and wherein the processing circuit is further configured to:
  configure the second uplink signal with a same uplink transmission timing as that of the first uplink signal.

26. The wireless communication device of claim 20, wherein the coverage enhancement mode further comprises a repetitive transmission of a second uplink signal with a second repetition period at least partly overlapped with the first repetition period, and wherein the processing circuit is further configured to:
  in response to the change in the downlink timing, perform the adjustment of the uplink transmission timing outside both of the first and second repetition periods.

27. The wireless communication device of claim 20, wherein the processing circuit is further configured to:
  if the first repetition period is not ongoing, adjust the uplink transmission timing to within ±Te seconds before the first repetition period begins, wherein Te is indicative of a timing error limit value and depends upon downlink and uplink characteristics.

28. The wireless communication device of claim 20, wherein the processing circuit is further configured to determine whether the first repetition period is longer than one radio resource time unit, based on one of:
  downlink control information (DCI) transmitted by the network node, wherein the DCI contains explicit or implicit information on a number of repetitions to use for the repetitive transmission of the first uplink signals, and
  radio resource control (RRC) configuration provided by the network node, wherein the RRC configuration contains a number of resources for the wireless communication device in a radio resource time unit, and wherein the number of resources explicitly or implicitly indicates the number of repetitions.

29. The wireless communication device of claim 28, wherein the processing circuit is further configured to, if the first repetition period is not longer than one radio resource time unit, adjust the uplink transmission timing according to a rule comprising the following conditions:
  a. a maximum amount of a magnitude of a timing change in one adjustment shall be Tq seconds;
  b. a minimum aggregate adjustment rate shall be 7*Ts per second, wherein Ts is a basic timing unit; and
  c. the maximum aggregate adjustment rate shall be Tq per 200 ms,
  wherein Tq depends on downlink and uplink characteristics.

30. The wireless communication device of claim 29, wherein Tq is mapped on a downlink bandwidth according to a table of:

| Downlink Bandwidth (MHz) | Tq |
| --- | --- |
| 1.4 | 17.5 Ts |
| 3 | 9.5 Ts |
| 5 | 5.5 Ts |
| ≥10 | 3.5 Ts. |

31. The wireless communication device of claim 28, wherein the one radio resource time unit corresponds to one Evolved universal terrestrial radio access network (EUTRAN) subframe or two EUTRAN subframes.

32. The wireless communication device of claim 20, wherein the wireless communication device comprises at least one of:
  an Evolved Machine-type communication (eMTC) device; and
  a Narrowband Internet-of-things (NB-IoT) device.

* * * * *